United States Patent [19]
Asano et al.

[11] Patent Number: 5,911,387
[45] Date of Patent: Jun. 15, 1999

[54] REEL FOR USE IN MAGNETIC TAPE CASSETTE

[75] Inventors: Katsuki Asano; Kiyoo Morita; Kazuo Hiraguchi, all of Kanagawa, Japan

[73] Assignee: Fuji Photo Film Co., Ltd., Kanagawa, Japan

[21] Appl. No.: 08/965,044

[22] Filed: Nov. 5, 1997

[30] Foreign Application Priority Data

Nov. 6, 1996 [JP] Japan ................................ 8-293986
Feb. 5, 1997 [JP] Japan ................................ 9-022790

[51] Int. Cl.$^6$ .......................... B65H 75/14; G11B 23/087
[52] U.S. Cl. .................... 242/605; 242/608.8; 242/613.4
[58] Field of Search ............................... 242/605, 613.4, 242/613.5, 608.8

[56] References Cited

U.S. PATENT DOCUMENTS

| | | |
|---|---|---|
| 4,664,328 | 5/1987 | Yamada . |
| 4,807,826 | 2/1989 | Iwahashi . |
| 4,846,419 | 7/1989 | Tateno et al. . |
| 5,071,084 | 12/1991 | Yamada et al. . |
| 5,174,520 | 12/1992 | Iwahashi . |
| 5,318,239 | 6/1994 | Posso . |
| 5,370,332 | 12/1994 | Goff et al. . |

*Primary Examiner*—Donald P. Walsh
*Assistant Examiner*—William A. Rivera
*Attorney, Agent, or Firm*—Sughrue, Mion, Zinn Macpeak & Seas, PLLC

[57] ABSTRACT

A reel for use in a magnetic tape cassette which includes upper and lower flanged tape reels housed in a cassette case made up of upper and lower cassette halves. The reel is characterized by including a clamp member which is press-fitted into a cutout formed in the outer peripheral surface of a reel hub of the tape reel to thereby hold the end of a magnetic tape wound on the reel hub, the clamp member being fitted into a receiving recess formed in the interior surface of at least one of the upper and lower flanges of the tape reels.

1 Claim, 10 Drawing Sheets

REEL FOR USE IN MAGNETIC TAPE CASSETTE

BACKGROUND OF THE INVENTION

The present invention relates to the structure of flanged tape reels housed in a cassette case comprising an upper cassette half and a lower cassette half.

A magnetic tape cassette widely used with audio or video equipment comprises upper and lower cassette halves molded from synthetic resin, or the like, and a pair of spools which have a magnetic tape wound thereon (e.g., reels or hubs) and are stored in the upper and lower cassette halves.

FIG. 1 is a perspective exploded view showing the principal constituent parts of a VTR magnetic tape cassette. A pair of flanged tape reels 2 on which a magnetic tape 1 is wound is housed in a cassette case comprising an upper cassette half 3 and a lower cassette half 4. A tape draw opening formed in the front portion of the cassette case is covered with a guard panel 5.

The upper cassette half 3 has a box-shaped profile and comprises a rectangular upper wall surface 6 having an opening for use as a window formed therein; a front side wall 7, a rear side wall 8, and lateral side walls 9, 9, all of which extend at right angles from the peripheral edge of the upper wall surface 6. The upper cassette half 3 is integrally formed from ABS resin, or the like, and a transparent window is welded to the upper wall surface 6. A leaf spring (not shown) for forcing the flanged tape reels 2 in a downward direction of the cassette is mounted at the center of the reverse side of the upper wall surface 6.

Similarly, the lower cassette half 4 has a box-shaped profile and comprises a rectangular lower wall surface 10, and longitudinal side walls 11, 12 and lateral side walls 13, 13, all of which extend at right angles from the peripheral edge of the bottom wall surface 10. Openings 15 are formed in the bottom wall surface 10 so as to permit insertion of drive shafts of a record/play device into reel hubs 14 of the flanged tape reels 2.

Partition walls 16 formed in a substantially circular pattern and extending upright from the upper wall surface 9 within the upper cassette half 3 and partition walls 16 formed in a substantially circular pattern and extending upright from the bottom wall surface 10 within the lower cassette half 4 abut each other so as to surround the flanged tape reels 2 within the cassette. The horizontal positions of the flanged tape reels 2 are restricted by coming into contact with the partition walls 16.

Each of the flanged tape reels 2 comprises a transparent disk-shaped flange 17 having an upper flange through hole 18 formed therein and a disk-shaped lower flange 19 integrally formed with a columnar reel hub 14. The lower flanges 19 are formed from highly-abrasion-resistant resin such as polyoxyethylene (POM), or the like.

FIG. 2 shows a conventional flanged tape reel 2 in detail. For the purpose of holding the end of a magnetic tape 1, a cutout 21 is formed in part of the circumferential surface of the reel hub 14 in the form of a combination of an opening and an internally-recessed cavity which is wider than the opening, thereby enabling a clamp pin 20 which serves as a clamp member to be fitted into the cavity from the outside in the radial direction of the reel hub 14.

The clamp pin 20 is a base member having the same curvature as that of the reel hub 14 and has a substantially C-shaped cross section in the direction perpendicular to the rotation axis of the magnetic tape 1. A side edge 22 externally protrudes from each open end of the clamp pin 20 in the circumferential direction of the reel hub 14 and has a taper 23.

FIG. 3 shows a conventional method of fitting the clamp pin 20 into the cutout 21. After the upper and lower flanges 17 and 19 have been joined together, the clamp pin 20 is inserted into the lower flange 19 through the upper flange through hole 18 and is fitted into the cutout 21 from the outside in the radial direction of the reel hub 14 so as to hold the magnetic tape 1. In order to prevent the clamp pin 20 from interfering with the upper and lower flanges 17 and 19 when being fitted into the cutout 21, as well as to firmly hold the end of the magnetic tape 1, the clamp pin 20 has substantially the same height as an interval between the lower surface of the upper flange 17 and the upper surface of the lower flange 19 in the axial direction of the reel 14. Namely, the clamp pin 20 has substantially the same height as that of the area of the reel hub 14 on which the magnetic tape 1 is wound.

In the aforementioned conventional reel for use with a magnetic tape cassette, the end of the magnetic tape is held as a result of the side edges 22 of the clamp pin 20 engaging guide protuberances 24 of the cutout 21. Accordingly, if the fitting force of the clamp pin 20 is reduced in order to improve the ease of assembly, a risk may arise of releasing the magnetic tape 1. In contrast, if an attempt is made to improve the force of the clamp pin 20 for holding the magnetic tape 1 by reducing the interval between the clamp pin 20 and the cutout 21, a risk may arise of cutting the magnetic tape. This is a first problem in the conventional technique.

In addition, a conventional reel for use in a magnetic tape cassette generally comprises a substantially-cylindrical reel body, an upper circular flange attached to one end of the reel body, and a lower circular flange attached to the other end of the reel body. With regard to this reel, there are demands for the upper and lower flanges being coaxially aligned in parallel with each other, as well as for the outer peripheries of the upper and lower flanges being aligned to each other. As shown in FIG. 4, bosses 155 are formed on an upper surface 154 of a top wall 153 of a reel body 152 (called as reel hub) integrally formed with a lower flange 151. The plurality of bosses 155 are provided around a pivot 156 at substantially equal intervals in a circumferential direction. Holes 158 are formed in the corresponding positions on an upper flange 157 so as to receive the bosses 155.

The upper flange 157 is brought into contact with the top wall 153 of the reel body 152 in such a way that the bosses 158 engage with the hole 158. The upper flange 157 is bonded to the reel body 152 by ultrasonically welding the bosses 155.

The reel body 152 comprises an inner peripheral wall 159 into which a hub is fitted, and an outer peripheral wall 160 on which a magnetic tape is wound. The inner peripheral wall 159 and the outer peripheral wall 160 are joined together by a plurality of ribs 161 radially provided around the pivot 156 at substantially equal angles in the circumferential direction. Specifically, since the upper surface 154 of the top wall 153 is formed in parallel with the lower flange 151, the upper and lower flanges 157 and 151 are positioned in parallel with each other by bringing the bosses 155 into engagement with the holes 158. In addition, the outer peripheries of the upper and lower flanges 157 and 151 are coaxially aligned to each other.

In the aforementioned conventional reel for use in a magnetic tape cassette, the top wall 153 of the reel body 152 is positioned at the center and has a small area. Further, there is so-called play between the bosses 155 and the holes 158, because the diameter of the boss 155 is smaller than that of the hole 158. For these reasons, there possibly arises a case where the upper and lower flanges 157 and 151 are held in an insufficiently parallel and coaxial relationship with each other. This is a second problem in the conventional technique.

SUMMARY OF THE INVENTION

In view of the first problem, the object of the present invention is to simultaneously improve the ease of assembly of a tape reel and the clamping force of the clamp pin without changing an interval between a clamp pin and a reel hub of a conventional reel.

The aforementioned object is accomplished by a reel for use in a magnetic tape cassette which includes upper and lower flanged tape reels housed in a cassette case made up of upper and lower cassette halves, the reel comprising:

a clamp member which is press-fitted into a cutout formed in the outer peripheral surface of a reel hub of each of the tape reels to thereby hold the end of a magnetic tape wound on the reel hub, the clamp member being fitted into a receiving recess formed in the interior surface of at least one of the upper and lower flanges of the tape reels.

Preferably, the receiving recess formed in the interior surface of the flange includes a through hole.

In view of the second problem, it is an object of the present invention to solve the above-mentioned problem, and particularly to provide a reel for use in a magnetic tape cassette in which the upper and lower flanges are held in an sufficiently parallel and coaxial relationship with each other.

The object can be achieved by a reel for use in a magnetic tape cassette, according to the present invention, comprising:

a reel for use in a magnetic tape cassette including a reel body comprising an outer peripheral wall on which a magnetic tape is wound and an inner peripheral wall coaxially arranged with respect to the outer peripheral wall, upper and lower flanges coaxially arranged in parallel with each other with the reel body sandwiched between them, and protruding ribs, each of which is disposed on the lower flange between the outer and inner peripheral walls and has a protruding boss to be welded at the upper end face for fixing the upper flange, the improvement being characterized by comprising:

an indentation which is formed in the bottom surface of the lower flange so as to correspond to the boss of each of the protruding ribs and is formed to such depth and diameter as to permit the fitting of the boss in order to prevent the radial dislocation of the lower flanges when they are stacked on top of each other.

Accordingly, so long as three ribs, each having a boss to be welded, are provided on the lower flange at equivalent angles in the circumferential direction outside the top wall of the reel body, the accuracy of axially aligning the upper and lower flanges parallel to each other is improved. Further, since the upper flange is disposed on the protruding ribs, they can be stably mounted on the reel body.

In addition to this, with the structure according to the present invention, the indentation makes the sink mark occurred in the bottom surface of the lower flange unnoticeable, and the lower flanges can be stacked at the time of storage by inserting the boss of one lower flange into the indentation of another lower flange.

DETAILED DESCRIPTION OF THE PREFERRED EMBODIMENTS

Figure 1:
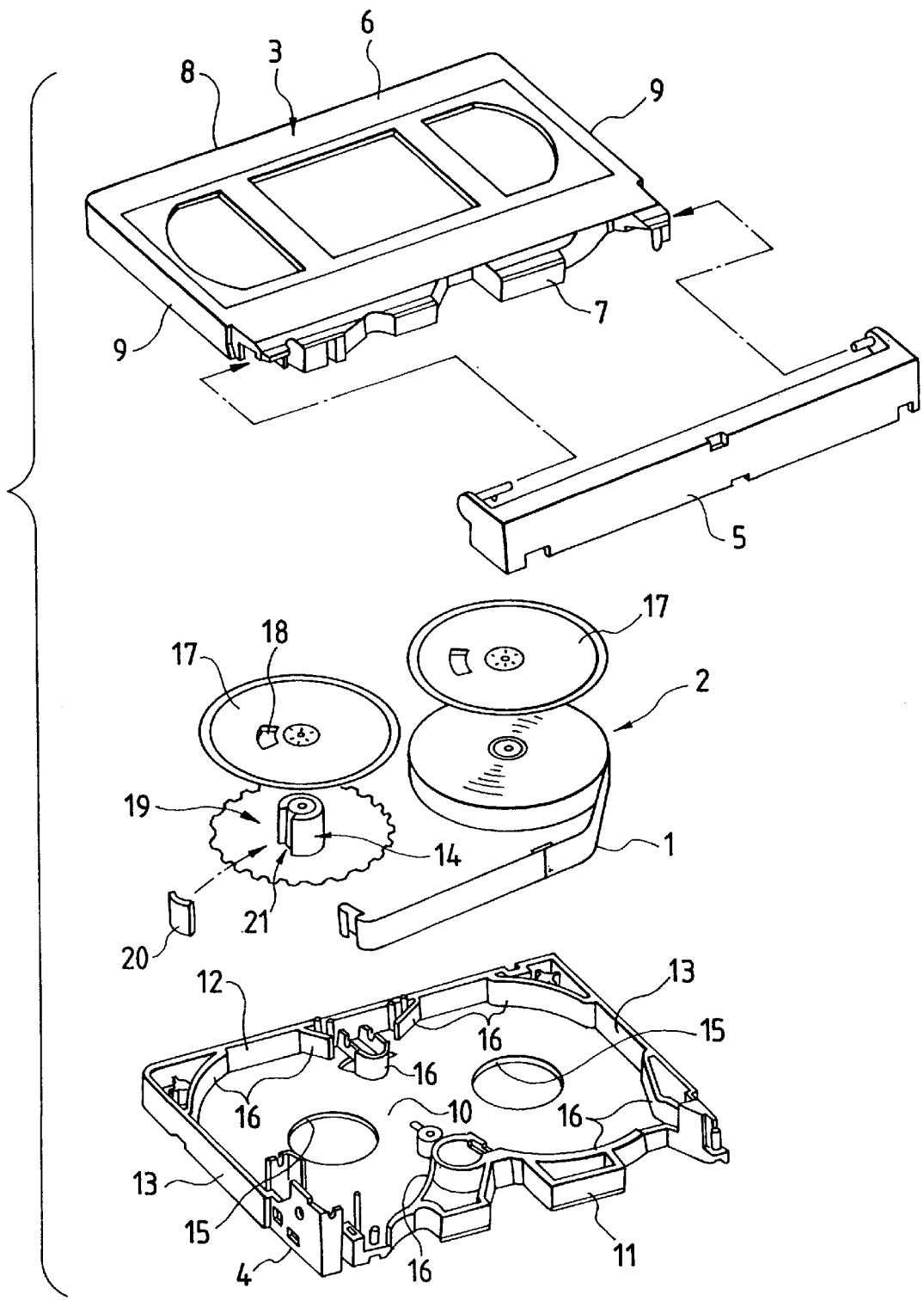
FIG. 1 is an exploded perspective view showing the principal constituent elements of a conventional VTR magnetic tape cassette.
Figure 2:
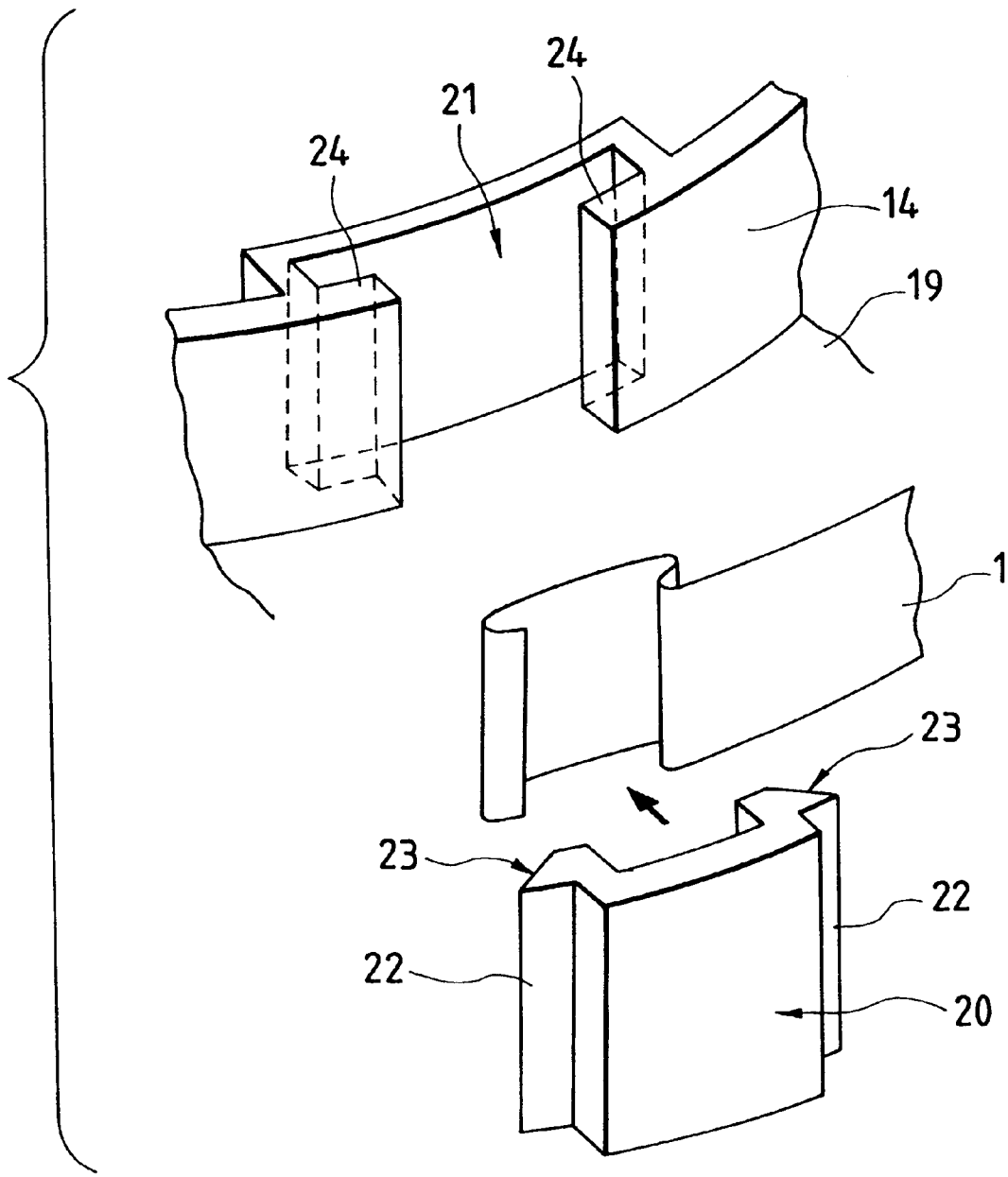
FIG. 2 is an enlarged view showing a clamp section of a conventional flanged tape reel.
Figure 3:
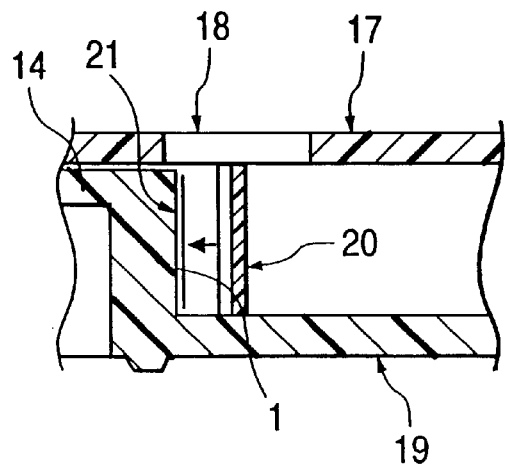
FIG. 3 is a cross-sectional view showing the clamp section of the conventional tape reel when it is assembled.
Figure 4:
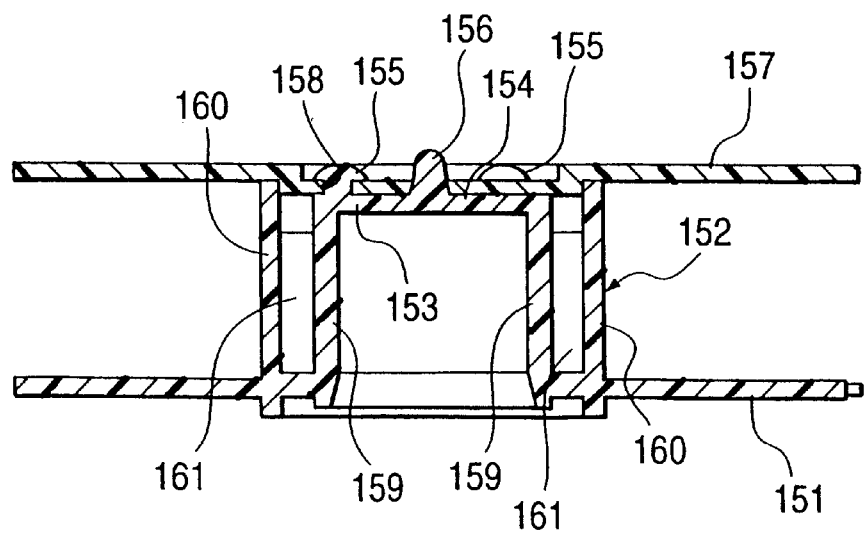
FIG. 4 is a cross-sectional view showing a conventional tape reel.

In reference to the accompanying drawings, an explanation will be given of a reel for use in a magnetic tape cassette in accordance with embodiments of the first aspect of the present invention. Since the reel in accordance with this embodiment is the same in structure as that shown in FIG. 1, its explanation will be omitted.

Figure 5:
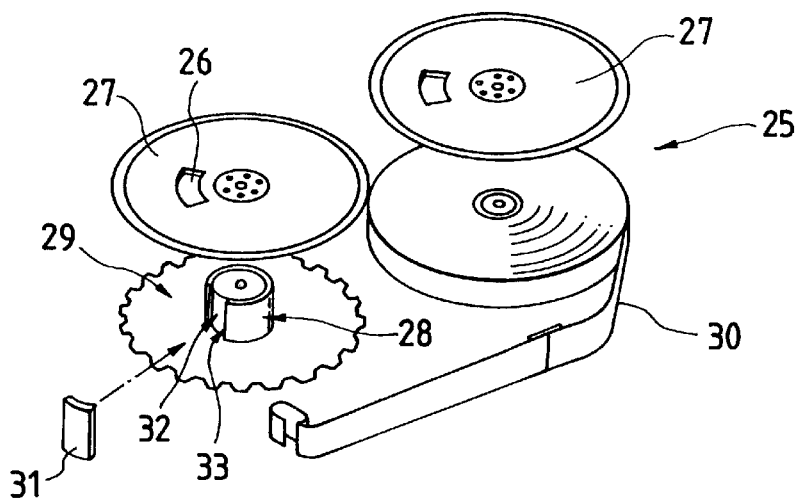
FIG. 5 is an exploded perspective view showing flanged taped reels according to the present invention.

Each of a pair of flanged tape reels 25 shown in FIG. 5 comprises a transparent upper flange 27 in which a through hole 26 is formed as a receiving recess and a lower flange 29 integrally formed with a reel hub 28.

Figure 6:
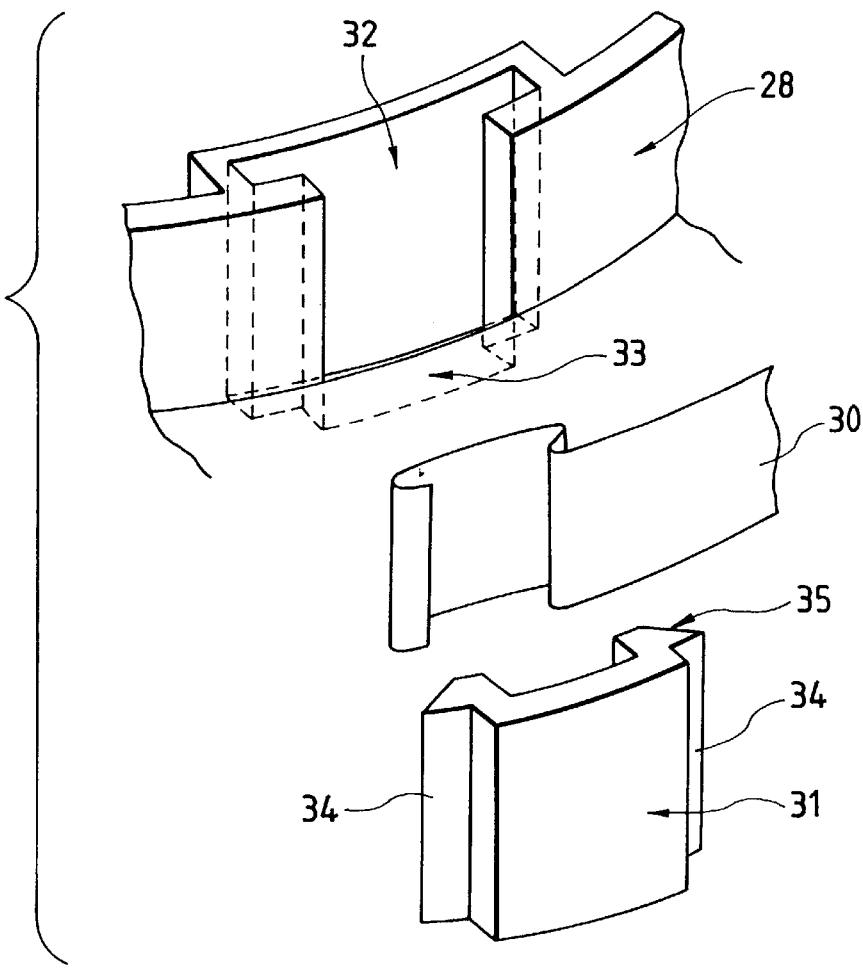
FIG. 6 is an enlarged view showing a clamp section of the flanged tape reel according to the present invention.

FIG. 6 is an enlarged view showing a clamp portion of the flanged tape reel according to the present invention. For the purpose of holding the end of a magnetic tape 30, a cutout 32 is formed in part of the circumferential surface of the reel hub 28 in the form of a combination of an opening and an internally-recessed cavity which is wider than the opening, thereby enabling a clamp pin 31 which serves as a clamp member to be fitted into the cavity from the outside in the radial direction of the reel hub 28. A receiving recess 33 is formed in a downward vicinity of the cutout 32 in the axial direction of the reel hub 28.

The clamp pin 31 is a base member having the same curvature as that of the reel hub 28 and has a substantially C-shaped cross section in the direction perpendicular to the rotation axis of the magnetic tape 30. A side edge 34 externally protrudes from each open end of the clamp pin 31 in the circumferential direction of the reel hub 28 and has a taper 35. The clamp pin 31 is formed so as to become higher than a part of the reel hub 28 on which the magnetic tape is wound.

FIGS. 7 through 10 show a method of fitting the clamp pin 31 which is the characteristics of the present invention into the cutout 32. First, an explanation will be given of a fitting method in accordance with a first embodiment of the present invention.

Figure 7:
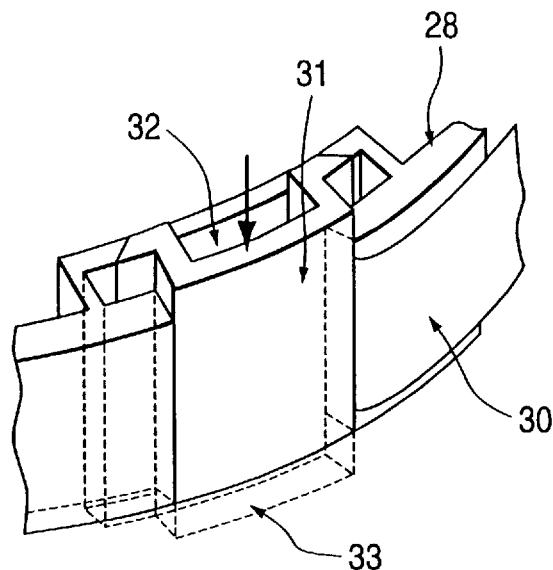
FIG. 7 is a perspective view showing a clamp section of a tape reel in accordance with first and second embodiments of the present invention.
Figure 8:
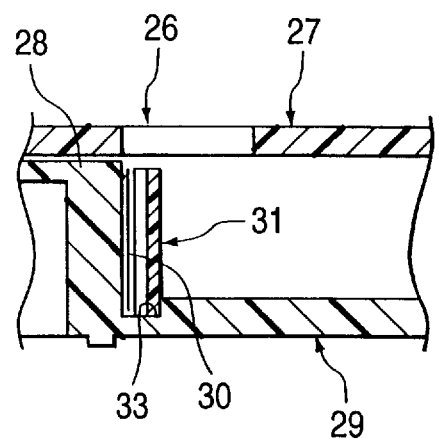
FIG. 8 is a cross-sectional view showing the clamp section of the tape reel in accordance with the first embodiment.

After the upper and lower flanges 27 and 29 have been joined together, the clamp pin 31 is inserted into the lower flange 29 through the upper flange through hole 26. The thus-inserted clamp pin 31 is pressed and fitted into the cutout 32 from the outside in the radial direction of the reel hub 28 so as to hold the magnetic tape 30. Subsequently, as shown in FIG. 7 (of which the upper and lower flanges 27 and 29 are left out), the clamp pin 31 is pushed into the receiving recess 33 formed in the lower flange 29 from above. As shown in FIG. 8, the clamp pin 31 is finally fitted into the receiving recess 33. The upper flange through hole 26 is formed to such a size as to permit the pressing of the clamp pin 31 into the cutout 32 even after the upper and lower flanges 27 and 29 have been joined together. In the present embodiment, the clamp pin 31 is fitted into the cutout 32, as well as into the receiving recess 33 formed in the lower flange 29, and therefore the clamping force of the clamp pin 31 can be improved further, as compared with that of a clamp pin of the conventional reel.

Figure 9:
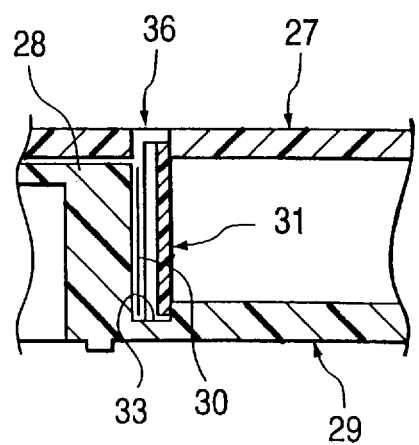
FIG. 9 is a cross-sectional view showing the clamp section of the tape reel in accordance with the second embodiment.

Next, an explanation will be given of a fitting method in accordance with a second embodiment of the present invention. After having been guided to the upper surface of the lower flange 29, the clamp pin 31 is pressed and fitted into the cutout 32 from the outside in the radial direction of the reel hub 28, to thereby hold the magnetic tape 30. As shown in FIG. 7 (from which the lower flange 29 is omitted), the clamp pin 31 is pushed into the receiving recess 33 formed in the lower flange 29 from above. Subsequently, the upper and lower flanges 27 and 29 are joined together, and, as shown in FIG. 9, the upper end of the clamp pin 31 is fitted into the upper flange through hole 36 formed into an indentation. In this case, the upper flange through hole 36 is formed smaller than the upper flange through hole 26 shown in FIG. 7 so as to permit the fit-insertion of the upper end of the clamp pin 31. In the second embodiment, since the clamp pin 31 is fitted into the cutout 32, as well as into the upper flange through hole 36 and the receiving recess 33 formed in the lower flange 29, the clamping force of the clamp pin 31 can be improved further, as compared with that of a clamp pin of the conventional tape reel.

Figure 10:
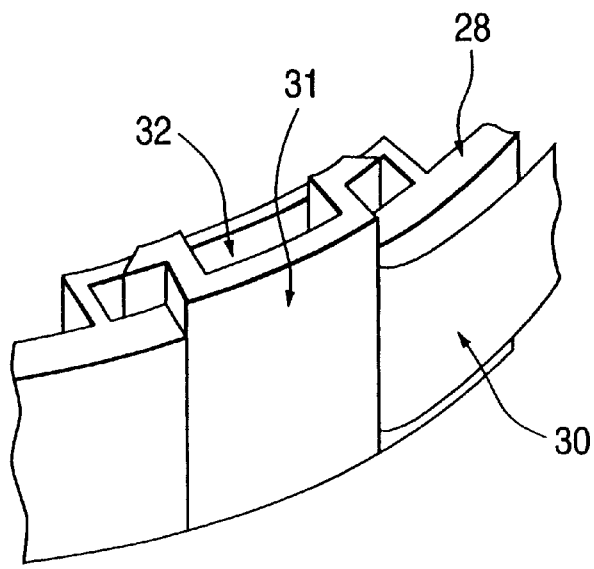
FIG. 10 is a cross-sectional view showing a clamp section of a tape reel in accordance with a third embodiment of the present invention.
Figure 11:
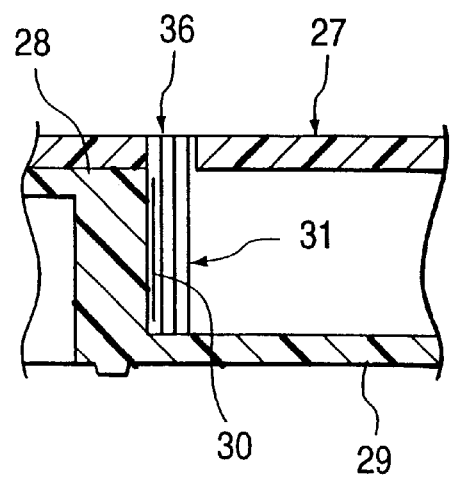
FIG. 11 is a cross-sectional view showing the clamp section of the tape reel in accordance with the third embodiment.

An explanation will now be given of a fitting method in accordance with a third embodiment of the present invention. As in the second fitting method, the clamp pin 31 is introduced to the upper surface of the lower flange 29. The clamp pin 31 is pressed into the cutout 32 from the outside in the radial direction of the reel hub 28 to thereby hold the magnetic tape 30 and is then fitted into the cutout 32, as shown in FIG. 10 (from which the lower flange 29 is omitted). Subsequently, the upper and lower flanges 27 and 29 are joined together, and, as shown in FIG. 11, the upper end of the clamp pin 31 is fitted into the upper flange through hole 36 formed into an indentation. As in the case shown in FIG. 9, the upper flange through hole 36 is formed so as to permit the fit-insertion of the clamp pin 31. In the third embodiment, the clamp pin 31 is fitted into the upper flange through hole 36, as well as into the cutout 32, and therefore the clamping force of the clamp pin 31 can be improved further in comparison with that of a clamp pin of the conventional tape reel.

As has been described above, the first aspect of the present invention provides a reel for use in a magnetic tape cassette which includes upper and lower flanged tape reels housed in a cassette case made up of upper and lower cassette halves, the improvement being characterized by comprising: a clamp member which is press-fitted into a cutout formed in the outer peripheral surface of a reel hub of each of the tape reels to thereby hold the end of a magnetic tape wound on the reel hub, the clamp member being fitted into a receiving recess formed in the interior surface of at least one of the upper and lower flanges of the tape reels. As a result, the clamp member can be fitted into the receiving recess formed in the interior surface of either the upper or lower flange, as well as into the cutout. Accordingly, the clamping force of the clamp pin can be improved further without changing the interval between the clamp pin and the reel hub, thereby enabling the prevention of removal of the magnetic tape.

In reference to FIGS. 12 through 18, an embodiment of built-in reels of a video cassette according to a second aspect of the present invention will be explained hereinafter.

To prevent the second problem of the conventional technique, it can be proposed that protruding ribs are formed on a lower flange so as to extend toward an upper flange between the inner and outer peripheral walls, and a boss to be welded is formed on the upper surface of each of the ribs. Further, receiving holes are formed on the upper flange so as to correspond to the bosses, and the bosses are engaged with the receiving holes formed on the upper flange. The thus-engaged bosses are ultrasonically welded.

With use of this means, so long as three ribs, each having a boss to be welded, are provided on the lower flange at equivalent angles in the circumferential direction outside the top wall of the reel body, the accuracy of axially aligning the upper and lower flanges parallel to each other is improved. Further, since the upper flange is disposed on the protruding ribs, they can be stably mounted on the reel body.

On the other hand, the reel for use in a magnetic tape cassette is formed by injection molding With regard to the aforementioned proposed technique; i.e., the conventional means for forming the bosses 155 on the upper surface of the top wall 153 of the reel body and for bringing the bosses 155 into engagement with the receiving holes 158 of the upper flange 157, since the lower flange 151, the inner peripheral wall 159, the outer peripheral wall 160, and the tope wall 153 have substantially the same thickness, no problem arises in the outer appearance of the reel as a result of injection molding. In contrast, with regard to the previously-described remedy for the conventional reel; i.e., the means for forming the protruding ribs on the flange, since the protruding ribs are greatly different in thickness from the other members, sink mark occurs in the bottom surface of the lower flange having the protruding ribs formed thereon, thereby impairing the outer appearance of the reel.

The storage of single components; i.e., magnetic-tape-cassette reel alone, particularly lower flanges alone, in a factory or warehouse or during transportation, is inefficient and requires the tools designed specifically for housing these components.

The embodiments according to the second aspect of the present invention has been contrived to solve the problem of this proposed technique, and also to provide a reel with superior outer appearance by rendering unnoticeable the sink mark occurred in the bottom surface of a lower flange corresponding to protruding ribs, as well as to realize easy storage of the reels.

Figure 12:
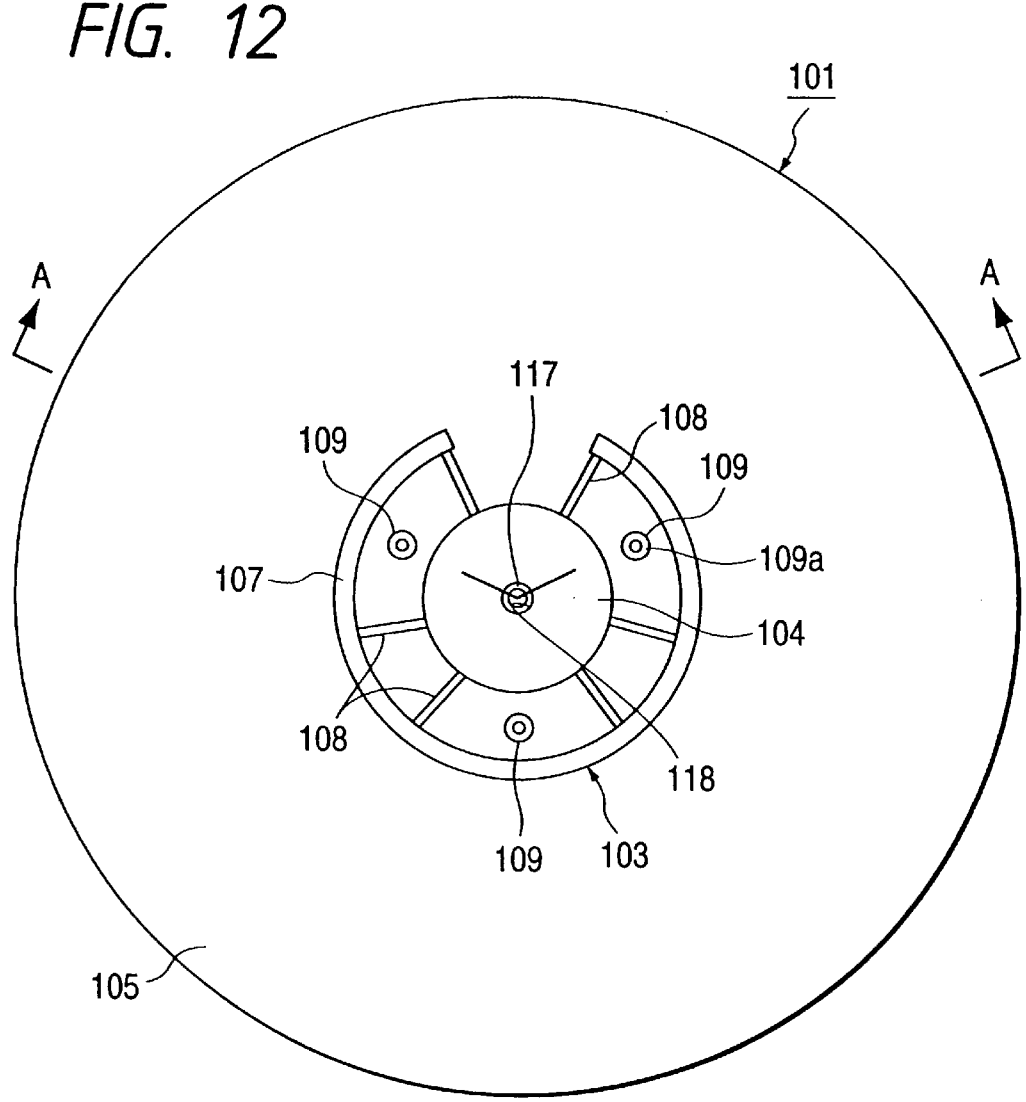
FIG. 12 is a plane view showing a reel for use in a magnetic tape in accordance with one embodiment of the present invention.
Figure 13:
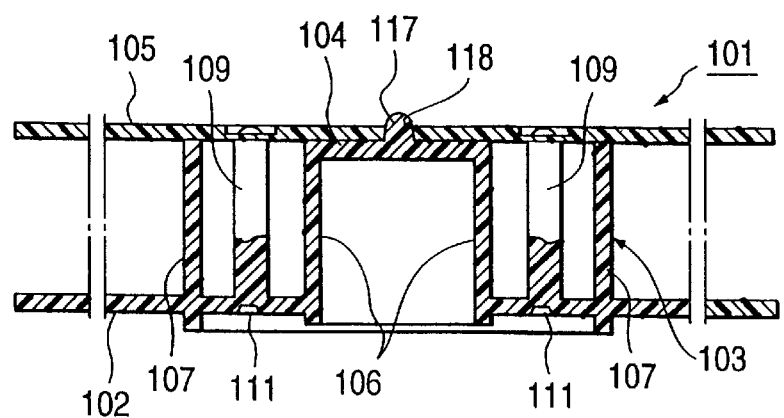
FIG. 13 is a partially-omitted enlarged cross-sectional view of the reel taken across line A—A shown in FIG. 12.
Figure 14:
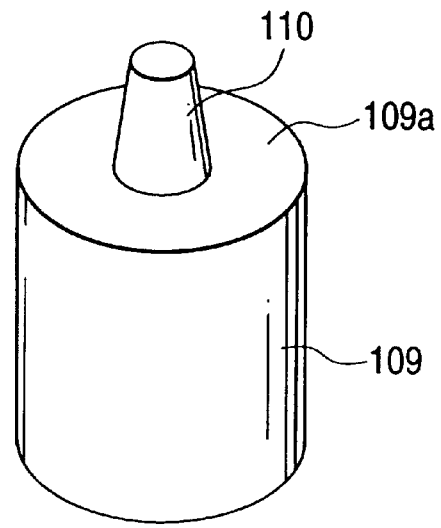
FIG. 14 is a perspective view showing the front end of a protruding rib.
Figure 15:
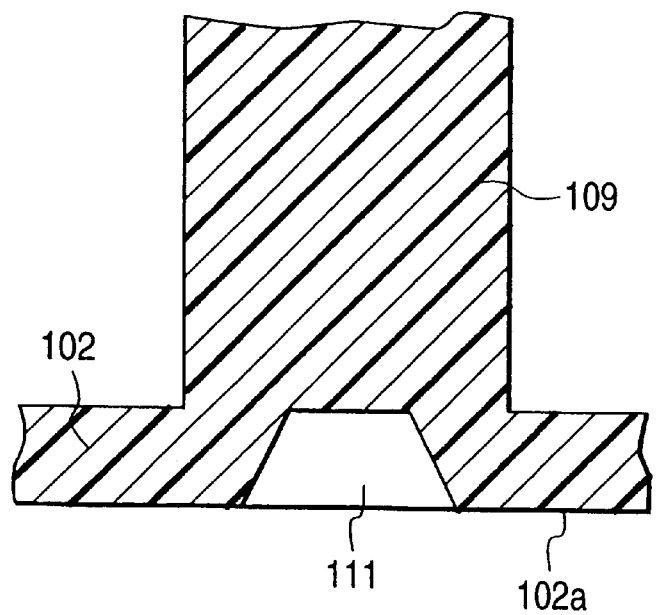
FIG. 15 is a cross-sectional view showing the principal portion of a lower flange.
Figure 16:
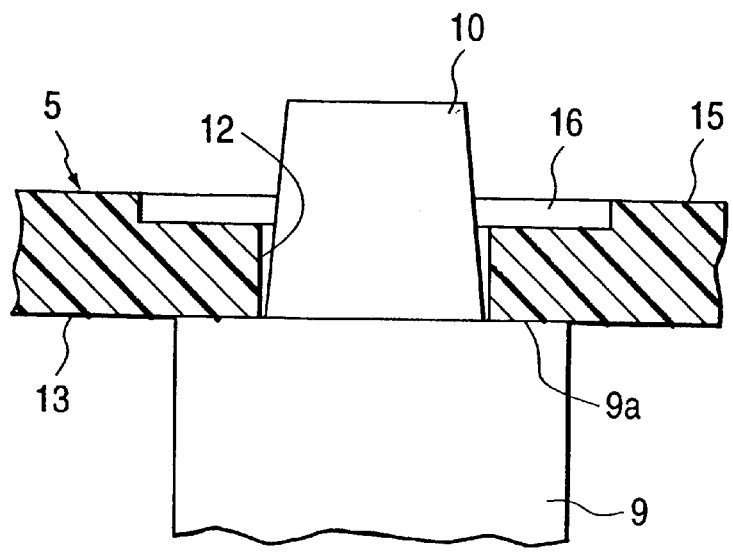
FIG. 16 is a cross-sectional view showing a boss to be welded when it is fitted into a receiving hole.
Figure 17:
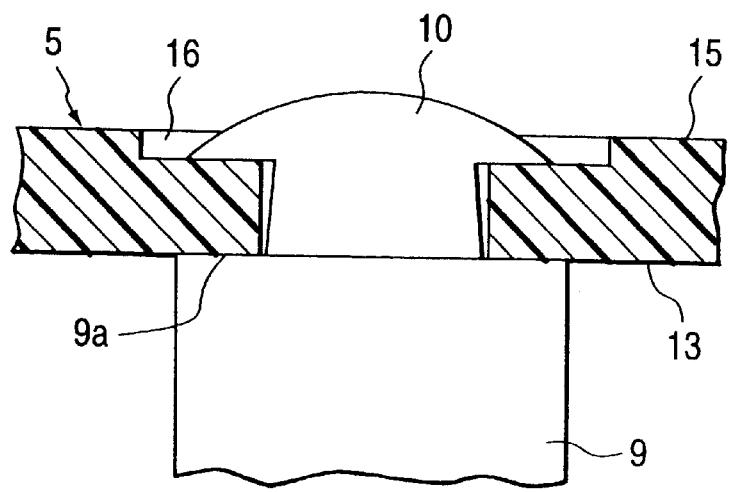
FIG. 17 is a cross-sectional view showing the principal portion of the boss when it is welded.
Figure 18:
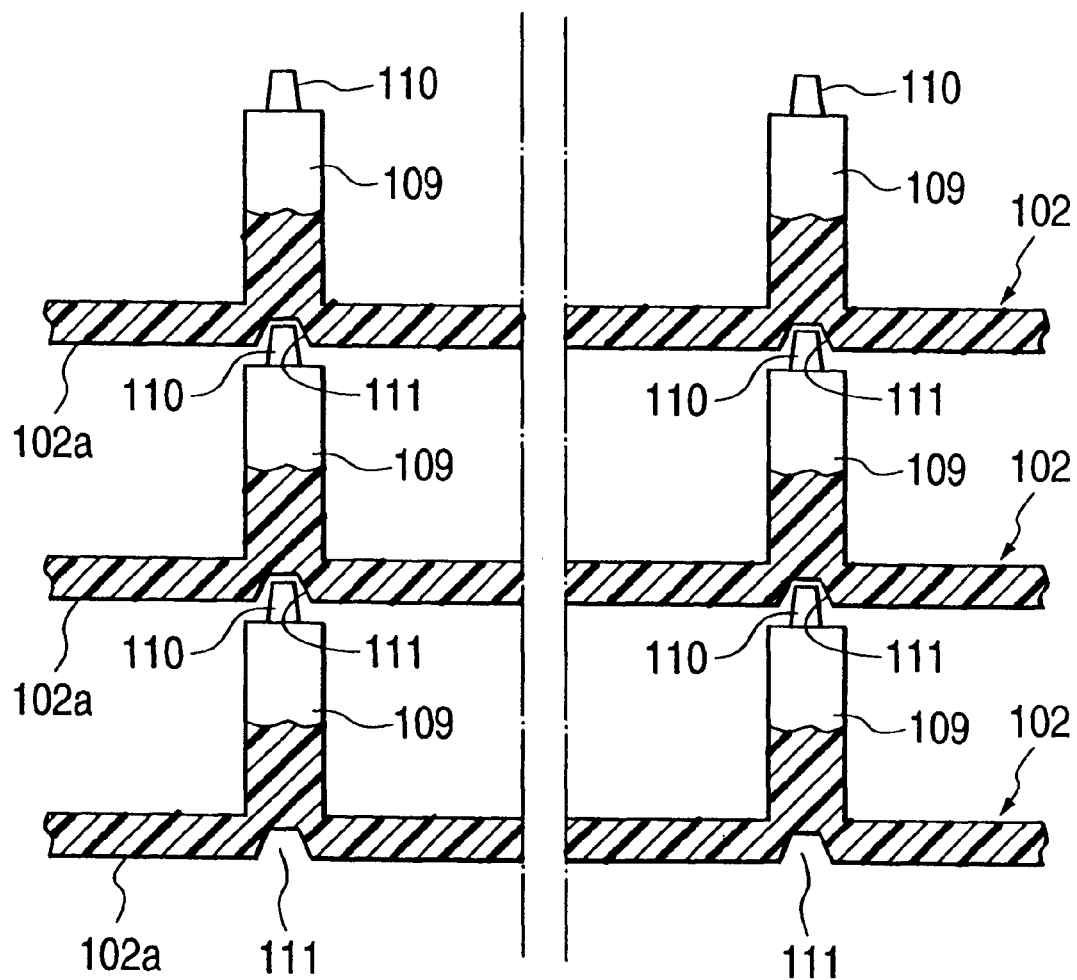
FIG. 18 is a cross-sectional view showing the principal portions of lower flanges when they are stacked.

FIG. 12 is a plane view showing a reel for use in a magnetic tape in accordance with one embodiment of the present invention; FIG. 13 is a partially-omitted enlarged cross-sectional view of the reel taken across line A—A shown in FIG. 12; FIG. 14 is a perspective view showing the front end of a protruding rib; FIG. 15 is a cross-sectional view showing the principal portion of a lower flange; FIG. 16 is a cross-sectional view showing a boss to be welded when it is fitted into a receiving hole; FIG. 17 is a cross-sectional view showing the principal portion of the boss when it is welded; and FIG. 18 is a cross-sectional view showing the principal portions of lower flanges when they are stacked.

As shown in FIGS. 12 and 13, the reel 101 comprises a substantially-cylindrical reel body 103 integrally formed at the center of a lower flange 102 of synthetic resin. An upper flange 105 is fixed to a top wall 104 of the reel body 103, and the upper and lower flanges 105 and 102 are coaxially arranged in parallel with each other. The reel body 103 principally comprises an inner peripheral wall 106 in which a drive shaft of a drive unit when the video tape is loaded into the drive unit; an outer peripheral wall 107 which surrounds outside the inner wall 106 and has a magnetic tape wound thereon; and a top wall 104 covering the upper surface of the inner peripheral wall 106. The inner and outer peripheral walls 106 and 107 are connected together by a plurality of ribs 108.

As shown in FIGS. 12 through 15, columnar protruding ribs 109 having a large diameter are provided upright on the lower flange 102 between the inner and outer peripheral walls 106 and 107 in such a way as to extend toward the upper flange 105. A boss 110 to be welded which is tapered toward its front protrudes from the upper end surface of each of the protruding ribs 109. The three protruding ribs 109 are disposed at even intervals in the circumferential direction. An indentation 111 is formed in the area of the bottom surface 102a of the lower flange 102 corresponding to the boss 110 of each of the three protruding ribs 109. The dimension and profile of the indentation 111 may be determined according to the material of resin or the dimension and profile of the protruding rib 109, as required. The indentation 111 is slightly larger in diameter than the boss 110 and is tapered in an upward direction. Further, in order to prevent the radial positional dislocation of the lower flanges when they are stacked on top of each other, it is desirable to form the indentation 111 to such a depth as to permit sufficient receipt of the tapered front edge of the boss 110.

As shown in FIGS. 16 and 17, receiving holes 112 are formed in the upper flange 105 so as to be opposite to the bosses 110. Further, a cylindrical weld recess 116 is formed on an upper surface 115 of the upper flange 5 so as to surround the receiving hole 112.

As shown in FIG. 13, a pivot 117 protrudes from the center of the top wall 104 of the reel body 103, and a hole 118 is formed in the upper flange 105 so as to correspond to the pivot 117.

In the reel having the foregoing structure in accordance with the present embodiment, both the upper and lower flanges 105 and 102 are formed by injection molding. The indentation 111 is formed in the bottom surface of the lower flange 102 so as to correspond to the boss 110 of the protruding rib 109, thereby rendering unnoticeable the sink mark occurred in the bottom surface as a result of a variation in wall thickness.

As shown in FIGS. 13 through 16, the upper flange 105 is laid on the thus-formed top wall 104 of the reel body 103 of the lower flange 102, and the upper and lower flanges 102 and 105 are arranged in parallel with each other. At this time, the pivot 117 is fitted to the hole 118, and the boss 110 protruding from each of the protruding ribs 109 is fitted into the receiving hole 112.

As shown in FIG. 17, the upper flange 105 is fixed by ultrasonically welding the boss 110 protruding from the receiving hole 112, and the thus-welded boss 110 is accumulated in the weld recess 116.

In the present embodiment according to the second aspect of the present invention, the presence of the indentation 111 renders unnoticeable the sink mark occurred in the bottom surface corresponding to the boss 110 of the protruding rib 109, thereby enabling an increase in the diameter of the protruding rib 109. More specifically, the area of an upper surface 109a which is used for positioning the lower flange 102 with respect to the upper flange 105 can be increased. Accordingly, the three protruding ribs 109 having the large upper surface 109a for positioning purposes are disposed at even intervals in the circumferential direction on the lower flange 102 outside the top wall 104 of the reel body 103. The accuracy of aligning the upper and lower flanges 105 and 102 in parallel with each other is improved, and the flanges are also correctly aligned to each other in a coaxial direction. Further, since the front end of the boss 110 is fused and solidified and becomes accumulated in the weld recess 116 of the upper flange 105, in a case where the material of the reel body 103 integrally formed with the lower flange 102 is changed, the degree of welding of the front end of the boss 110 can be changed correspondingly, thereby rendering the boss 110 flexible in response to the change of material.

As shown in FIG. 18, the indentation 111 formed in the lower flange 102 is slightly larger in diameter than the boss 110 and is formed to such a depth as to sufficiently receive the front end of the boss 110 in order to prevent the radial positional dislocation of the flower flanges 102 when they are stacked on top of each other. As a result, the lower flanges 102 can be efficiently, or easily, stacked in a wasteless manner in a factory or warehouse or during transportation by inserting the boss 110 of one lower flange 102 into the indentation 111 of the bottom surface 102a of another lower flange 102.

Although the present invention has been described with reference to the built-in reel 101 of the video cassette in the foregoing embodiment, the invention can be applied to any types of reels, so long as the reel is used for a magnetic tape and comprises upper and lower flanges joined together by a reel body. Further, although the weld recess 116 is formed in the upper flange in the foregoing embodiment, the present invention is applied to a reel have no such a recess. Still further, four or more protruding ribs 109, each having the boss 110, may be disposed on the lower flange 102.

As has been described above, an indentation is formed in the bottom surface of a lower flange corresponding to a boss to be welded of a protruding rib, thereby rendering unnoticeable the sink resulting from a variation in the thickness of the lower flange and, hence, resulting in a reel with superior outer appearance. The indentation has a slightly larger diameter than that of the boss and is formed to such a depth as to sufficiently receive the front end of the boss 110 in order to prevent the radial positional dislocation of the lower flanges 102 when they are stacked on top of each other. Therefore, the lower flanges can be easily stacked in a factory or warehouse or during transportation before being assembled into reels by inserting the boss of one lower flange into the indentation of another lower flange.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A reel for use in a magnetic tape cassette comprising:

a reel body having an outer peripheral wall on which a magnetic tape is wound and an inner peripheral wall coaxially arranged with respect to the outer peripheral wall;

upper and lower flanges coaxially arranged in parallel with each other with the reel body sandwiched between them;

protruding ribs, each of which is disposed on the lower flange between the outer and inner peripheral walls and has a protruding boss to be welded at the upper end face of the upper flange for fixing the upper flange; and an indentation which is formed in the bottom surface of the lower flange so as to correspond to the boss of each of the protruding ribs and is formed to such depth and diameter as to permit the fitting of the boss in order to prevent the radial dislocation of the lower flanges when they are stacked on top of each other.

* * * * *